United States Patent
Satish et al.

(10) Patent No.: US 7,975,308 B1
(45) Date of Patent: Jul. 5, 2011

(54) METHOD AND APPARATUS TO SECURE USER CONFIDENTIAL DATA FROM UNTRUSTED BROWSER EXTENSIONS

(75) Inventors: Sourabh Satish, Fremont, CA (US); Govind Salinas, Austin, TX (US); Zulfikar Ramzan, San Mateo, CA (US)

(73) Assignee: Symantec Corporation, Mountain View, CA (US)

( * ) Notice: Subject to any disclaimer, the term of this patent is extended or adjusted under 35 U.S.C. 154(b) by 949 days.

(21) Appl. No.: 11/864,346

(22) Filed: Sep. 28, 2007

(51) Int. Cl.
- G06F 7/04 (2006.01)
- G06F 12/00 (2006.01)
- G06F 12/14 (2006.01)
- G06F 13/00 (2006.01)
- G06F 17/30 (2006.01)
- G11C 7/00 (2006.01)

(52) U.S. Cl. .............. 726/26; 726/11; 726/21; 713/152; 713/161; 713/170; 713/182

(58) Field of Classification Search .............. 726/26
See application file for complete search history.

(56) References Cited

U.S. PATENT DOCUMENTS

| 2004/0078334 A1* | 4/2004 | Malcolm et al. ............... 705/50 |
| 2007/0182714 A1* | 8/2007 | Pemmaraju .................. 345/168 |
| 2008/0184358 A1* | 7/2008 | Stamos et al. ................ 726/11 |

OTHER PUBLICATIONS

Gittlen, Sandra. "Options emerge for combating stealth Web transaction attacks" [online], Oct. 5, 2007, pp. 1-3 [retrieved on Oct. 22, 2007]. Retrieved from the Internet:URL: <http://www.computerworld.com/action/article.do?command=printArticleBasic&articleId=9041042>.

Gühring, Philipp. "Concepts against Man-in-the-Browser Attacks" [online], Jun. 16, 2006, pp. 1-15 [retrieved on Oct. 22, 2007]. Retrieved from the Internet:<URL: http://svn.cacert.org/CAcert/SecureClient.pdf>.

Wang, Chenxi. "Man-In-The Browser: Emerging Attacks Exploit Browser Vulnerabilities" Executive Summary [online], Apr. 17, 2007, p. 1 [retrieved on Oct. 22, 2007]. Retrieved from the Internet:<URL: http:// www.forrester.com/Research/Document/Excerpt/0,7211,42042,00.html>.

* cited by examiner

*Primary Examiner* — Michael Pyzocha
*Assistant Examiner* — Shewaye Gelagay
(74) *Attorney, Agent, or Firm* — Gunnison, McKay & Hodgson, L.L.P.; Philip McKay (57) ABSTRACT

Embodiments in accordance with the invention install a primary security browser extension first in the browser event notification order list and a secondary security browser extension last in the event notification order list. On receipt of a user data event including user confidential data at the primary security browser extension, the user confidential data is obfuscated by the primary security browser extension and the user data event including the obfuscated data is released to a next browser extension in the browser event notification order list. Upon receipt of the user data event at the secondary security browser extension, the obfuscated data is restored with the original user confidential data and the user data event is released for further processing.

16 Claims, 5 Drawing Sheets

METHOD AND APPARATUS TO SECURE USER CONFIDENTIAL DATA FROM UNTRUSTED BROWSER EXTENSIONS

BACKGROUND OF THE INVENTION

1. Field of the Invention

The present invention relates to computer systems. More particularly, the present invention relates to computer security.

2. Description of Related Art

Collection of user confidential data has been an ever increasing focus of computer malware. Spyware, rootkits, and malicious browser extensions, such as browser helper objects (BHOs), all attempt to gather user confidential data. For example, malicious drive-by downloads can install a silent browser helper object (BHO) that a user may not be aware of. Once installed, the silent BHO has full access to form posts and/or data object model (DOM) events in order to gather data entered in form fields by a user. With identity theft becoming a larger problem, these types of attacks are rising as other security vulnerabilities are increasingly secured.

In some systems, such as Windows Vista operating systems, in which the user is prompted for BHO installation, a user may permit a malicious BHO installation as the disclosed purpose may be completely different from that expected by a user or the disclosed purpose may be misunderstood by a user. Once installed, either explicitly by the user or silently by exploiting a vulnerability in the browser, the malicious BHO has full access to user confidential data.

SUMMARY OF THE INVENTION

In accordance with one embodiment of the invention, a method for securing user confidential data from untrusted browser extensions includes: installing a primary security browser extension first in a browser event notification order list utilized by a web browser; installing a secondary security browser extension last in the browser event notification order list; receiving a user data event at the primary security browser extension, the user data event including user confidential data; obfuscating the user confidential data in the user data event, the obfuscating replacing the user confidential data with obfuscated data in the user data event; releasing the user data event including the obfuscated data for processing by a subsequent browser extension next in the browser event notification order list; receiving the user data event including the obfuscated data at the secondary security browser extension; de-obfuscating the obfuscated data in the user data event, the de-obfuscating replacing the obfuscated data with the user confidential data in the user data event; and releasing the user data event including the user confidential data for further processing.

In some embodiments, prior to obfuscation of the user confidential data in the user data event, enumerated browser extensions and associated browser extension threads are disabled from receiving selected browser events, such as data object model (DOM) state events; and then re-enabled after de-obfuscation of the obfuscated data.

Embodiments described herein are best understood by reference to the following detailed description when read in conjunction with the accompanying drawings.

BRIEF DESCRIPTION OF THE DRAWINGS

Common reference numerals are used through the drawings and detailed description to indicate like elements.

DETAILED DESCRIPTION

Typically, most web browsers include one or more browser support extension mechanisms. For example, Windows Internet Explorer (IE) utilizes browser helper object (BHOs), and Firefox utilizes extensions or plug-ins. These browser extensions may or may not have a user interface (UI). Many browser extensions do not utilize a UI and are meant to offer added services to the content being rendered in the browser, like annotating the content or links.

Conventionally, a browser extension is installed on a computer system and registers with the operating system for loading onto a web browser and to receive browser events, also termed browser event notifications. For example, both Windows Explorer and Internet Explorer (IE) use the same registry for registering browser extensions and load the browser extensions from the registry. A parameter in the registry entry of a browser extension can designate the particular web browser. For example, a parameter in the registry entry of a browser extension can designate not for use by Explorer, e.g., Explorer=1, then that browser extension would not be loaded inside Windows Explorer, but the browser extension would be loaded in Internet Explorer. As another example, Firefox utilizes a configuration file for registering browser extensions, and Firefox loads the browser extensions from the configuration file.

As a user interacts with a web page, such as by entering data in form fields, browser events associated with the web page are generated, such as a begin navigate event, a post data event, complete navigate event, a key stroke event, a data submission in a form field event, as well as many other well documented browser events. Also, typically, when a user navigates to a web page, the web browser maintains the entire content of the page as a data object model (DOM) object. As a user enters data into the web page, the DOM object is updated with the user data resulting in DOM state events.

The web browser permits each registered browser extension see each event, and the event is sent down to each browser extension in the event notification order. Typically, a browser event associated with user confidential data includes the actual user data as well as a DOM object pointer that points to the memory location of the DOM object maintaining the content of the web page.

The web browser passes an event to registered browser extensions in accordance with an event notification order. In Internet Explorer, the registered browser extensions receive browser events in the order in which the browser extensions are loaded; and the order in which the browser extensions are loaded is in ascending order of the browser extensions globally unique identifiers (GUIDs). In Firefox, the order in which the browser extensions receive browser events is the order in which the browser extensions appear in the configuration file, which is the order in which the browser extensions were loaded into the browser.

As the web browser is becoming the most frequently used application on a personal computer, and as more user confidential data is being entered through the web browser, such as banking and shopping transactions, malicious attacks are being increasingly focused on the web browser. There are an increasing number of malicious exploits that can install malicious code so that a malicious browser extension persists on a target computer system. For a malicious browser extension to persist on a computer system, typically a malicious file is created so that the malicious extension persists on disk, and a registry entry associated with the malicious browser extension is created to notify the web browser that a browser extension has been registered with the operating system.

Thus, for example, if a user enters user confidential data into a form field of a web page, and a malicious browser extension is present on the web browser, when the malicious browser extension receives an event, the malicious browser extension potentially has the ability to access and modify the content of the event. For example, the malicious browser can copy or modify the user confidential data, such as a bank account routing number in the post data parameter of the event, resulting in compromise of the user confidential data.

Figure 2A:
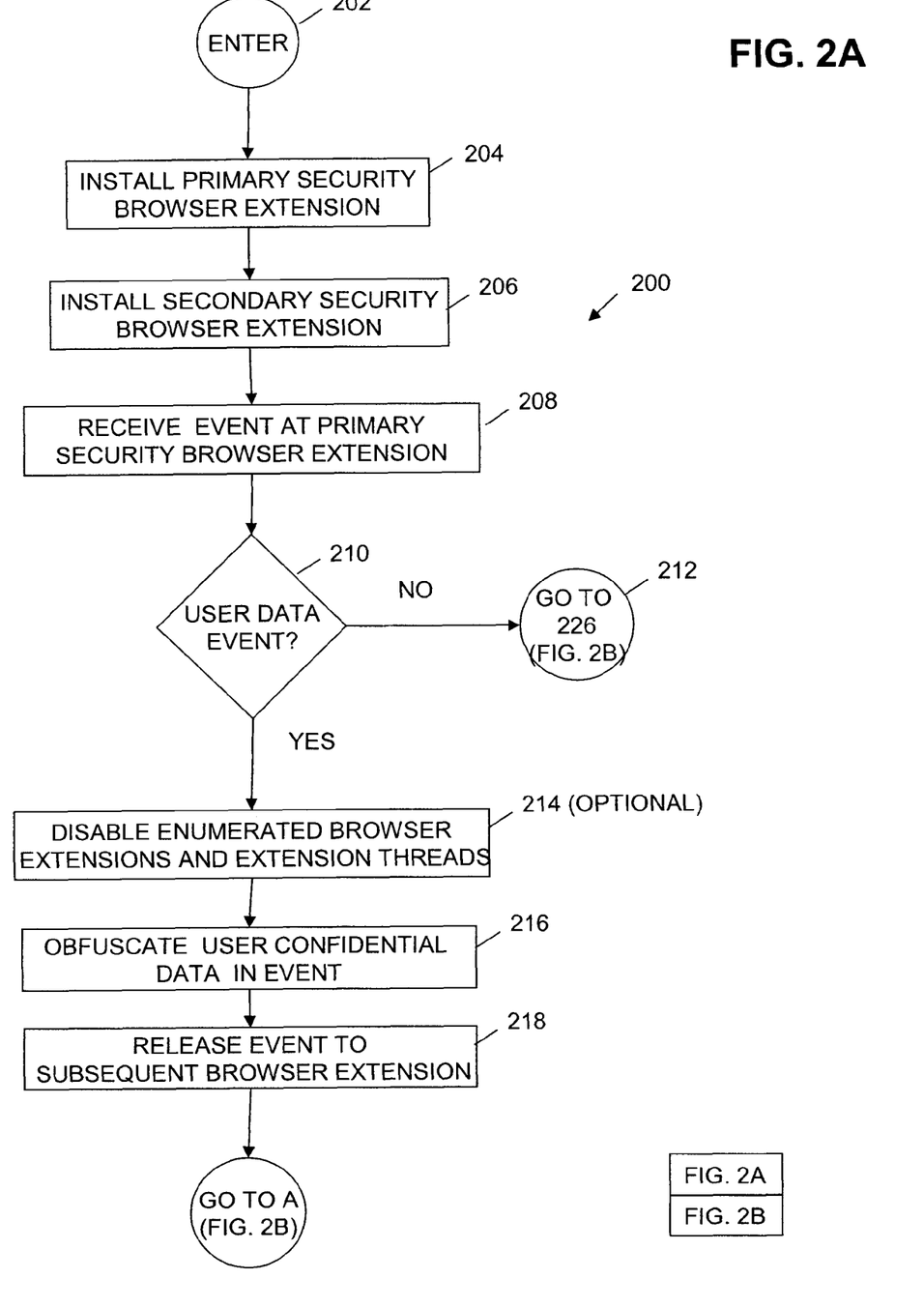
FIGS. 2A and 2B illustrate a flow diagram of a method for securing user confidential data from untrusted browser extensions in accordance with one embodiment of the invention.
Figure 2B:
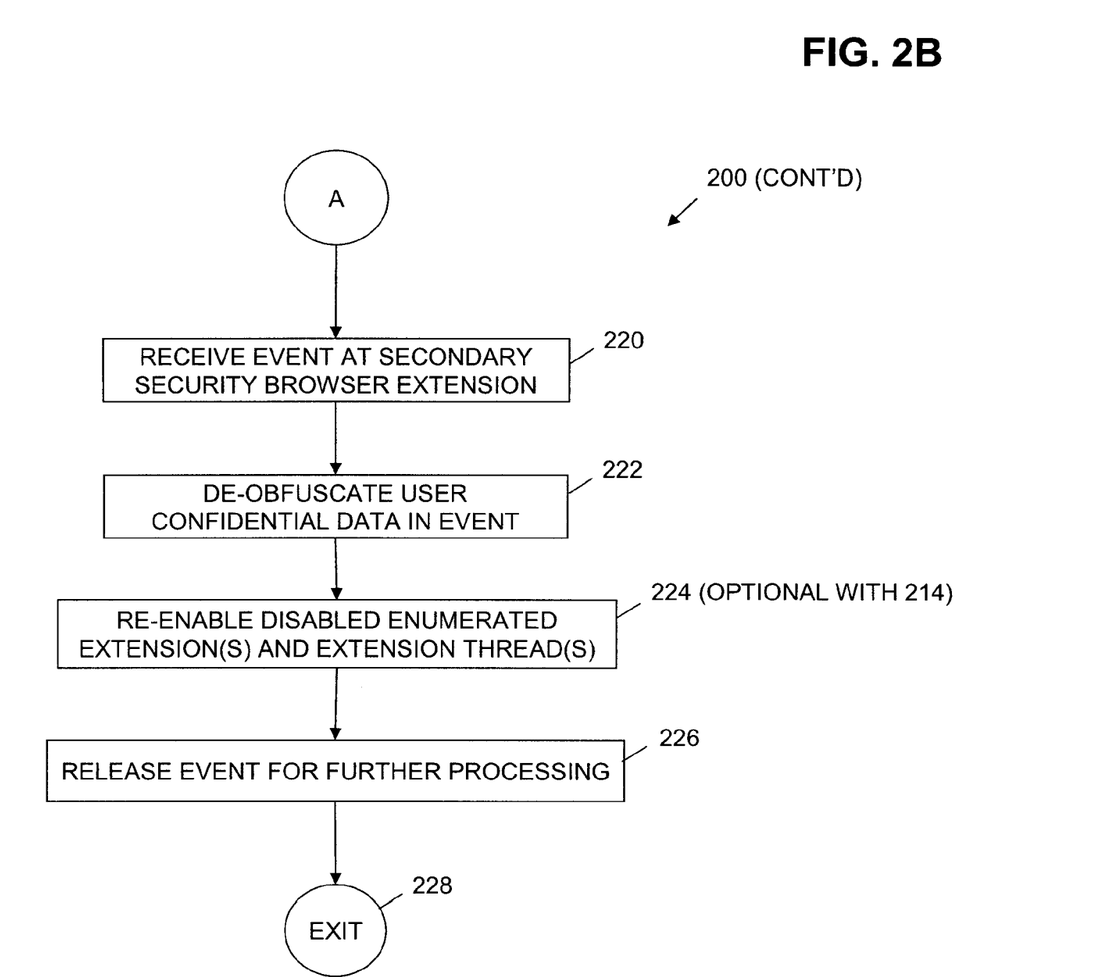

Embodiments in accordance with the invention secure user confidential data in user data events from compromise by untrusted web browser extensions, such as malicious web browser extensions. Referring now generally to FIG. 2, in one embodiment, a security application is installed on a host computer system which installs two security browser extensions: a primary security browser extension that is registered to receive browser events first in the browser event notification order (operation 204); and a secondary security browser extension that is registered to receive browser events last in the browser event notification order (operation 206).

When a browser event is received at the primary security browser extension (operation 208), a determination is made whether the event is a user data event, e.g., includes user confidential data (check operation 210). In one embodiment, if the event is not determined to be a user data event ("NO"), the event is released for further processing (operation 226), such as to the next browser extension in the event notification order.

Alternatively, if the event is determined to be a user data event ("YES"), the user confidential data in the event is obfuscated by the primary security browser extension (operation 216) and released to the next browser extension in accordance with the event notification order. The event is then passed in accordance with the event notification order, until it is received by the secondary security browser extension (operation 220). The secondary security browser extension de-obfuscates the obfuscated data to restore the user confidential data in the event (operation 222) and releases the event for further processing (operation 226), for example, for sending by the web browser to a web site.

In some embodiments, optionally, upon receipt and determination of a user data event by the primary security browser extension, enumerated browser extensions in the browser event notification order and associated browser extension threads are disabled from receiving selected event notifications, such as data object model (DOM) state events (operation 214). In these embodiments, after receipt of the user data event at the secondary security browser extension, the disabled enumerated browser extensions and associated browser threads are re-enabled (operation 224).

Figure 1:
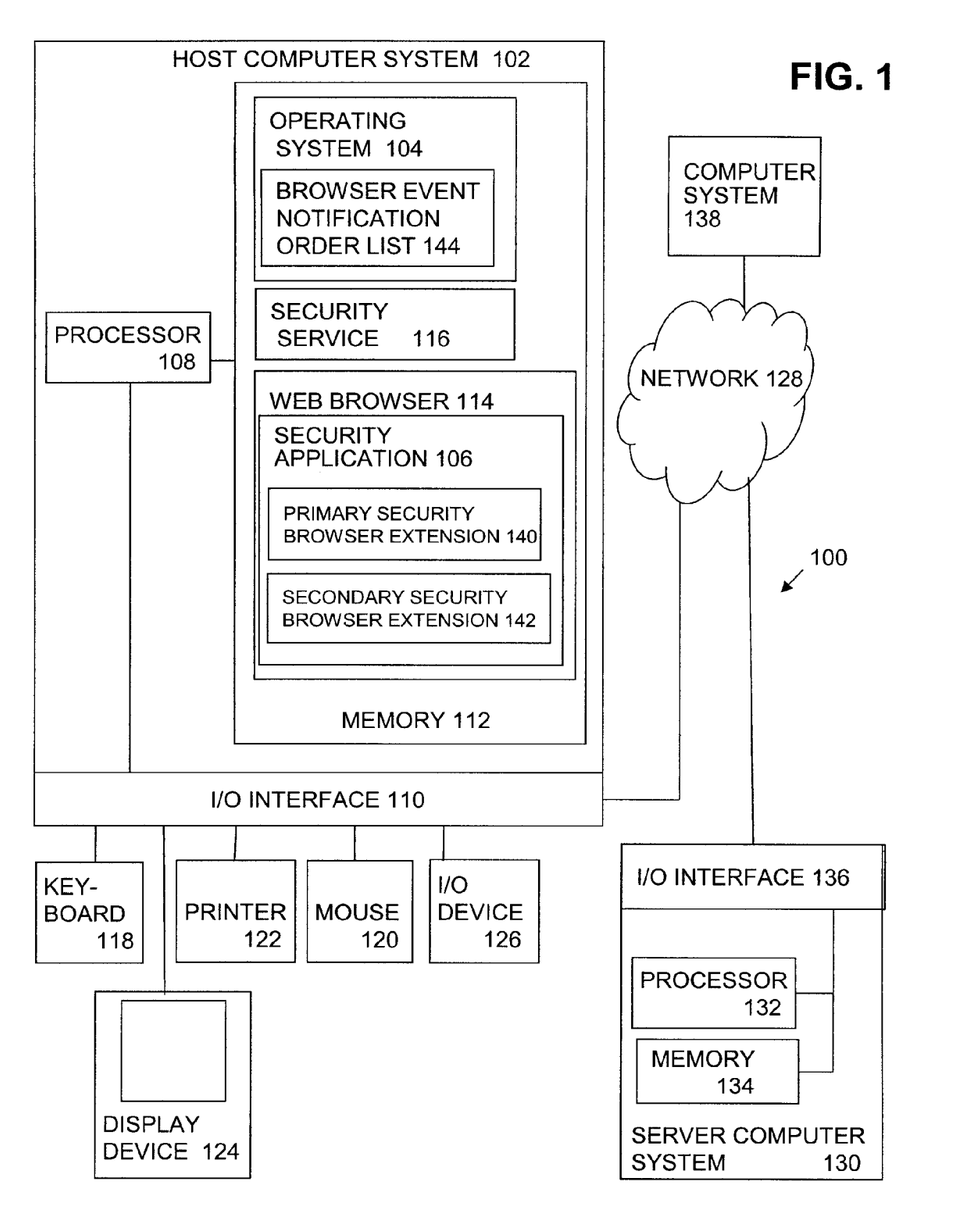
FIG. 1 is a diagram of a computer system including a security application for securing user confidential data from untrusted browser extensions executing on a host computer system in accordance with one embodiment of the invention.

Referring now to FIG. 1, more particularly, FIG. 1 is a diagram of a computer system 100 including a security application 106 for securing user confidential data from untrusted browser extensions installed on and executing on a host computer system 102, e.g., a first computer system, in accordance with one embodiment of the present invention. Host computer system 102, sometimes called a user device, typically includes a central processing unit (CPU) 108, hereinafter processor 108, an input output (I/O) interface 110, and a memory 112, including an operating system 104 and a web browser 114. In one embodiment, operating system 104 and/or web browser 114 maintains an event notification order list 144, such as a browser extension registry or browser extension configuration file, that provides the order in which registered browser extensions receive events from web browser 114.

In one embodiment, memory 112 includes security application 106. In one embodiment, security application 106 installs and registers two security browser extensions in the event notification order of web browser 114: a primary security browser extension 140 that is registered to receive browser events first in the browser event notification order; and a secondary security browser extension 142 that is registered to receive browser events last in the browser event notification order. In one embodiment, primary security browser extension 140 and secondary security browser extension 142 are browser helper objects (BHOs).

In one embodiment, memory 112 can further include a security service 116 which provides cryptographic keys for use in obfuscating user confidential data by primary security browser extension 140 and for de-obfuscating obfuscated user confidential data by secondary security browser extension 142. In some embodiments, security service 116 securely stores user confidential data. In one embodiment, security service 116 communicates with primary security browser extension 140 and secondary security extension 142 over a secure communication channel (not shown).

In one embodiment, web browser 114 renders web page content and receives user data, such as user confidential data, input into rendered form fields for sending to web page servers, such as a computer system 138. In one embodiment, web browser 114 also maintains DOM objects associated with rendered web pages.

In the present embodiment, web browser 114 is any one of a number of conventional web browser applications, such as Windows Internet Explorer, or Firefox. Web browser 114 utilizes browser extensions installed on and registered on host computer system 102. Herein a browser extension is an application installed on and registered on host computer system 102, such as a browser helper object (BHO), browser plug-in, or other browser extension that interacts with web browser 114.

As earlier described, web browser 114 sends browser events, i.e., herein also simply termed events, to registered browser extensions in accordance with an event notification order list, such as in accordance with a browser extension registry, browser extension load list, browser extension configuration file, or other listing utilized by web browser 114 for determining the event notification order of registered browser extensions.

For example, in the web browser Internet Explorer, the list of loaded browser extensions, i.e., the browser registry, is managed inside IEFRAME.dll. This registry is enumerated via a function at 0x7e28c265 for ieframe.dll version 7.0.5730.11. Internet Explorer loads browsers extensions, such as browser helper objects (BHOs), in alphabetic ascending order of the GUIDs of the browser extensions and passes events to the browser extensions in the order of load.

Typically when web browser 114 receives a user input, such as submission of user confidential data, web browser 114 generates a browser event that is passed to each of the browser extensions in the order of the browser event notification order, e.g., browser event notification order list 144. In this way, each browser extension can perform its associated processes, if any, on the event. As earlier noted, should a malicious browser extension be installed and registered on web browser 114, user confidential data present in an event, if any, is subject to compromise by the malicious browser extension when it receives the event.

Host computer system 102 may further include standard devices like a keyboard 118, a mouse 120, a printer 122, and a display device 124, as well as, one or more standard input/output (I/O) devices 126, such as a compact disk (CD) or DVD drive, floppy disk drive, or other digital or waveform port for inputting data to and outputting data from host computer system 102. In one embodiment, security application 106 is loaded into host computer system 102 via I/O device 126, such as from a CD, DVD or floppy disk containing security application 106.

In one embodiment, host computer system 102 is coupled to external systems by a network 128, such as the Internet. For example, host computer system 102 is coupled to a server computer system 130 and computer system 138 via network 128. Server computer system 130 typically includes a processor 132, a memory 134, and an I/O interface 136.

In one embodiment, computer system 138 can be a web content server hosting a web page. In one embodiment, computer system 138 is similar to host computer system 102 and/or server computer system 130, for example, includes a central processing unit, an input output (I/O) interface, and a memory. Computer system 138 may further include standard devices like a keyboard, a mouse, a printer, a display device and an I/O device(s). The various hardware components of computer system 138 are not illustrated to avoid detracting from the principles of the invention.

Network 128 can be any network or network system that is of interest to a user. In various embodiments, I/O interface 110 and I/O interface 136 include analog modems, digital modems, or a network interface card. The particular type of and configuration of host computer system 102, computer system 138, and server computer system 130 are not essential to this embodiment of the present invention.

Herein, in one embodiment, malicious code is defined as any computer program, module, set of modules, or code that enters a computer system environment without an authorized user's knowledge and/or without an authorized user's consent. A malicious browser extension, such as a malicious BHO, that can access user private data in a browser event is one example of malicious code. Further herein, malicious activity is any activity resulting from the execution of malicious code.

FIGS. 2A and 2B illustrate a flow diagram of a method 200 for securing user confidential data from untrusted browser extensions in accordance with one embodiment of the invention. In the present description, web browser 114 is described with reference to Internet Explorer. The examples provided herein are for clarity of description and are not intended to limit the present invention to Internet Explorer, and the invention is applicable to other web browsers.

Referring now to FIGS. 1 and 2A together, in one embodiment, execution of security application 106 by processor 108 results in the operations of method 200 as described below. Initially, security application 106 is installed on host computer system 102 and method 200 is entered at an ENTER operation 202 with processing transitioning to an INSTALL PRIMARY SECURITY BROWSER EXTENSION operation 204.

In INSTALL PRIMARY SECURITY BROWSER EXTENSION operation 204, security application 106 installs and registers a primary security browser extension, herein also termed primary security extension 140, on host computer system 102. As earlier described, Internet Explorer loads browser helper objects in alphabetic ascending order of the globally unique identifiers (GUIDs) and passes events in the order of load.

In one embodiment, security application 106 utilizes a GUID, i.e., a primary GUID, for primary security extension 140 so that primary security extension 140 is placed first in the event notification order to receive a browser event from web browser 114. In alternate embodiments, other techniques, such as patching the event notification order list, e.g., the load order sequence, can be used to place primary security extension 140 first in the event notification order sequence.

Registering as the first browser helper object (BHO) in the event notification order list ensures that the primary security extension 140 initially receives a user data event prior to other registered browser extensions. From INSTALL PRIMARY SECURITY BROWSER EXTENSION operation 204, processing transitions to an INSTALL SECONDARY SECURITY BROWSER EXTENSION operation 206.

In INSTALL SECONDARY SECURITY BROWSER EXTENSION operation 206, security application 106 installs and registers a secondary security browser extension, herein also termed secondary security extension 142, on host computer system 102. As earlier described, Internet Explorer loads browser helper objects in alphabetic ascending order of the globally unique identifiers (GUIDs) and passes events in the order of load.

In one embodiment, security application 106 utilizes a GUID, i.e., a secondary GUID, for secondary security extension 142 so that secondary security extension 142 is placed last in the event notification order to receive a browser event from web browser 114. As earlier described, in alternate embodiments, other techniques, such as patching the event notification order list, e.g., the load order sequence, can be used to place secondary security extension 142 last in the event notification order sequence.

Registering as both the first browser extension (operation 204) and as the last browser extension in event notification order list 144 ensures that security application 106 itself is not bypassed in event notifications, for example by a malicious browser extension, e.g., a malicious BHO.

In some embodiments, security application 106 evaluates the registered browser extensions for exempted browser extensions that are allowed to access the user confidential data in an event, such as other security browser extensions. The exempted browser extensions are then reordered in the event notification order so that they are subsequent to secondary security browser extension 142.

In one embodiment, security application 106 compares each registered browser extension against a white list of exempted browser extension entries each identifying an associated exempted browser extension. When a registered browser extension matches an entry in the white list, the associated browser extension is exempted; otherwise, the registered browser extension is not exempted. Examples of registering the primary security extension 140 and secondary security extension 142 are later further described herein with reference to FIGS. 3A, 3B, and 3C. From INSTALL SECONDARY SECURITY BROWSER EXTENSION operation 206, processing waits until receipt of a browser event from web browser 114, with processing transitioning to a RECEIVE EVENT AT PRIMARY SECURITY BROWSER EXTENSION operation 208.

In RECEIVE EVENT AT PRIMARY SECURITY BROWSER EXTENSION operation 208, a browser event is received at primary security extension 140 from web browser 114. From RECEIVE EVENT AT PRIMARY SECURITY BROWSER EXTENSION operation 208, processing transitions to a USER DATA EVENT check operation 210.

In USER DATA EVENT check operation 210, primary security extension 140 determines whether the event is a user data event. In one embodiment, a user data event is any event that includes user confidential data. In one embodiment, user confidential data is any data, data type, or data pattern that is determined for encryption, replacement, or obfuscation in accordance with an embodiment of the invention.

In one embodiment, the transaction type of the event is evaluated to determine if it matches a listing of transactions types associated with user confidential data. If the transaction type matches a listed transaction type, the event is determined to be a user data event.

In one embodiment, data in a post data parameter of the event is evaluated to determine whether or not the event is a user data event. For example, in one embodiment, data in a post data parameter of the event is evaluated for a data pattern indicative of user confidential data, such as a credit card number, a bank account number, a social security number, a user name, a user password, or other user confidential data indicator. When the data pattern matches a user confidential data pattern, the event is determined to be a user data event.

In one embodiment, the event is identified as a user data event because the primary security browser extension 140 has the user confidential data to provide a form filling functionality in the event. Upon a determination that the event is not a user data event ("NO"), from USER DATA EVENT check operation 210, processing transitions to a RELEASE EVENT TO FURTHER PROCESSING operation 226 (FIG. 2B), where the event is released to further processing, such as release to a next browser extension in the browser event notification order list 144, or to exempted browser extensions. From RELEASE EVENT TO FURTHER PROCESSING operation 226 (FIG. 2B), processing transitions to an EXIT operation 228, with processing exiting method 200, or optionally returning to operation 208 (FIG. 2A) on receipt of a next event at primary security extension 140.

Referring back again to USER DATA EVENT check operation 210, alternatively, upon a determination that the event is a user data event ("YES"), processing transitions from USER DATA EVENT check operation 210 to an optional DISABLE ENUMERATED BROWSER EXTENSIONS AND EXTENSION THREADS operation 214, or proceeds directly to an OBFUSCATE USER CONFIDENTIAL DATA IN EVENT operation 216.

In optional DISABLE ENUMERATED BROWSER EXTENSIONS AND EXTENSION THREADS operation 214, in one embodiment, primary security extension 140 disables loaded browser extensions and associated extension threads from receiving selected browser notifications. In particular in one embodiment, loaded browser extensions and associated extension threads are disabled from receiving DOM state change event notifications as data is being entered in form fields.

In one embodiment, security application 106 enumerates and identifies the loaded browser extensions. For example, as earlier described, the list of loaded browser extensions is managed inside IEFRAME.dll for Internet Explorer. This list is enumerated via a function at 0x7e28c265 for ieframe.dll version 7.0.5730.11. In one embodiment, security application 106 patches the enumeration routine, for example using hooking/interception techniques, to prevent DOM related events from being sent to the enumerated browser extensions, i.e., those browser extensions other than primary security extension 140 and secondary security extension 142.

Although a loaded browser extension may not be receiving DOM state change event notifications, this does not prevent the loaded browser extension, such as a malicious browser extension, from having a process thread that polls for browser or DOM state events and performs the same state extraction task, e.g., extraction of user confidential data, if the thread identifies form fields.

Thus, in one embodiment, security application 106 enumerates process threads whose ThreadStartAddress, i.e., the address of the thread function, belongs to a disabled browser extension address space. Once such threads are identified, these threads are suspended for the duration of the event transaction. From optional DISABLE ENUMERATED BROWSER EXTENSIONS AND EXTENSION THREADS operation 214, processing transitions to an OBFUSCATE USER CONFIDENTIAL DATA IN EVENT operation 216.

In OBFUSCATE USER CONFIDENTIAL DATA IN EVENT operation 216, user confidential data present in the event is obfuscated. In one embodiment, user confidential data present in the post data parameter of the event is obfuscated. In some embodiments, alternatively or additionally, a DOM pointer in the event is obfuscated, for example, by replacing the actual DOM pointer with a dummy DOM pointer, i.e., a false DOM pointer. In one embodiment, the actual DOM pointer is stored in a local secure memory location.

Thus, for example, in one embodiment, primary security extension 140 requests and obtains a security key from security service 116, for example over a secure communication channel, and utilizes the security key to encrypt the user confidential data, thereby replacing user confidential data with encrypted data. In some embodiments, primary security extension 140 identifies itself to security service 116 when requesting the security key. In some embodiments, security service 116 generates a unique new security key when primary security extension 140 requests the security key.

As another example, primary security extension 140 uses a resident obfuscation algorithm, such as an XOR algorithm, to obfuscate the user confidential data in the event, thereby replacing the user confidential data with obfuscated data. In still another embodiment, primary security extension 140 stores the user confidential data with security service 116, or in a local secure memory location, and replaces the user confidential data with dummy data.

Examples of obfuscation of user confidential data and DOM pointers is later further described herein with reference to FIGS. 4A, 4B, and 4C. From OBFUSCATE USER CONFIDENTIAL DATA IN EVENT operation 216, processing transitions to a RELEASE EVENT TO SUBSEQUENT BROWSER EXTENSION operation 218.

In RELEASE EVENT TO SUBSEQUENT BROWSER EXTENSION operation 218, the event including the obfuscated user confidential data, herein also termed obfuscated data, is released to the next browser extension in event notification order list 144. Thus, at this point the subsequent browser extension, unless disabled in operation 214, will receive the event but will not have access to the user confidential data as the user confidential data was obfuscated in operation 216. From RELEASE EVENT TO SUBSEQUENT BROWSER EXTENSION operation 218, processing transitions to a RECEIVE EVENT AT SECONDARY SECURITY BROWSER EXTENSION operation 220.

Referring now to FIG. 2B, in RECEIVE EVENT AT SECONDARY SECURITY BROWSER EXTENSION operation 220, the event including the obfuscated data is received at secondary security extension 142. From RECEIVE EVENT AT SECONDARY SECURITY EXTENSION operation 220, processing transitions to a DE-OBFUSCATE USER CONFIDENTIAL DATA IN EVENT operation 222.

In DE-OBFUSCATE USER CONFIDENTIAL DATA IN EVENT operation 222, the user confidential data obfuscated in operation 216 is restored. For example, if the actual user confidential data in the post data parameter of the event was obfuscated, the original user confidential data is restored in the post data parameter in accordance with the obfuscation method.

Further, if the DOM object was replaced with a dummy DOM object in operation 216, the original DOM object is restored. For example, in one embodiment, the actual DOM pointer is obtained by secondary security extension 142 from the local secure memory location storing the actual DOM pointer, and the dummy DOM pointer in the event is replaced with the retrieved DOM pointer.

As another example, in one embodiment, if the user confidential data was encrypted by primary security extension 140 in accordance with a security key obtained from security service 116, secondary security extension 142 obtains the key from security service 116 and utilizes the key to decrypt the encrypted data and obtain the user confidential data. The encrypted data is then replaced with the user confidential data. In some embodiments, secondary security extension 142 identifies itself to security service 116 when requesting the security key.

As another example, if primary security extension 140 used a resident obfuscation algorithm, such as an XOR algorithm, to obfuscate the user confidential data in the event, secondary security extension 142, utilizes the XOR algorithm to de-obfuscate the obfuscated data and restore the user confidential data. In still another embodiment, if primary security extension 140, in operation 216, stored the user confidential data with security service 116, or in a local secure memory location, and replaced the user confidential data with dummy data, secondary security extension 142 would obtain the stored user confidential data from security service 116, or from the local secure memory location, and replace the dummy data with the user confidential data. From DE-OBFUSCATE USER CONFIDENTIAL DATA IN EVENT operation 222, processing transitions to an optional RE-ENABLE DISABLED ENUMERATED EXTENSIONS AND EXTENSION THREADS operation 224, where optional operation 214 was earlier performed, or transitions directly to RELEASE EVENT FOR FURTHER PROCESSING operation 226.

In optional RE-ENABLE DISABLED ENUMERATED EXTENSIONS AND EXTENSION THREADS operation 224, extensions and extension threads disabled in operation 214, if any, are re-enabled. Thus, in embodiments in which operation 214 was performed, the actions taken to disable enumerated extensions and extension threads are remediated such that the disabled extensions and extension threads are re-enabled. In embodiments in which optional operation 214 was not performed, this operation is not performed. From optional RE-ENABLE DISABLED ENUMERATED EXTENSIONS AND EXTENSION THREADS operation 224, processing transitions to RELEASE EVENT FOR FURTHER PROCESSING operation 226.

In RELEASE EVENT FOR FURTHER PROCESSING OPERATION 226, the event is released for further processing. For example, from operation 224, or directly from operation 222, the event now including the user confidential data is released for further processing, for example, by the web browser or as another example, by any remaining exempted browser extensions following secondary security extension 142. From RELEASE EVENT FOR FURTHER PROCESSING operation 226, processing transitions to EXIT operation 228, with processing exiting method 200, or optionally returning to operation 208 on receipt of a next event.

Figure 3A:
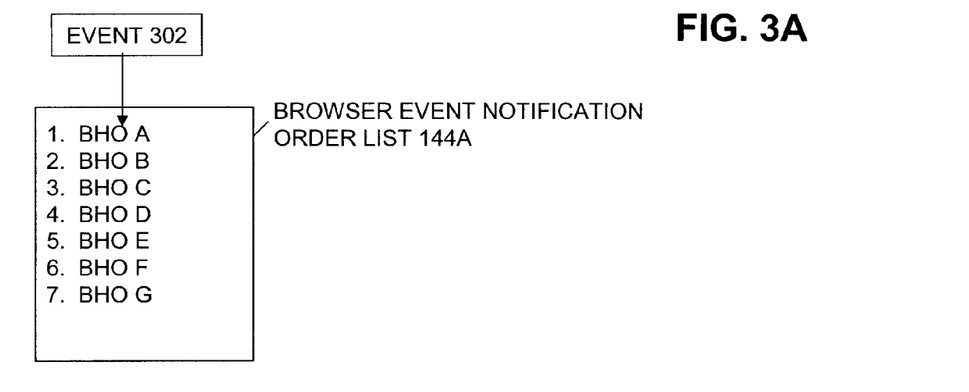
FIG. 3A illustrates a block diagram representation of a browser event notification order list prior to installation of the primary security browser extension and the secondary security browser extension.
Figure 3B:
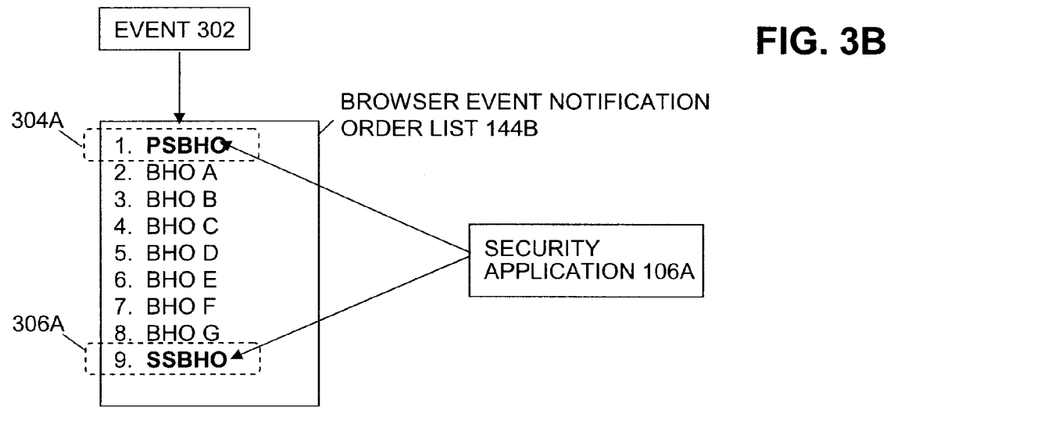
FIG. 3B illustrates a block diagram representation of a browser event notification order list after installation of the primary security browser extension and the secondary security browser extension in accordance with one embodiment of the invention.
Figure 3C:
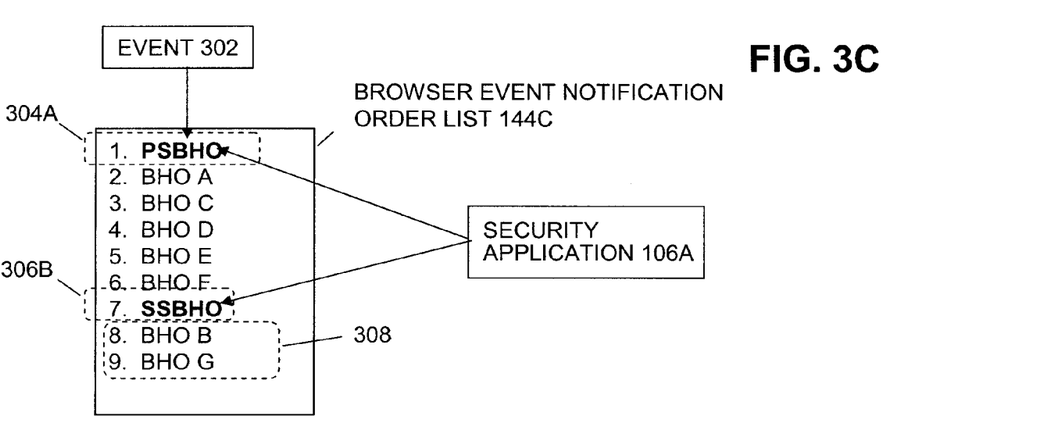
FIG. 3C illustrates a block diagram representation of a browser event notification order list after installation of the primary security browser extension and the secondary security browser extension in the browser event notification order list in which exempt browser extensions are present in accordance with one embodiment of the invention.

Referring now to FIGS. 3A, 3B, and 3C, FIG. 3A illustrates a block diagram representation of a browser event notification order list 144A of web browser 114 prior to installation of primary security extension 140 and secondary security extension 142. Typically a browser event, shown as event 302 is passed to each registered BHO in the order of browser event notification order list 144A.

Thus, in FIG. 3A, event 302 would be initially received by BHO A, which is first, i.e., "1", in the event notification order, then to BHO B, and then subsequently through to BHO G which is last, i.e., "7", in the event notification order. Assuming for example, that BHO D is a malicious web browser extension, BHO D would receive the event and have access to user confidential data present in the event.

Referring now to FIG. 3B, FIG. 3B illustrates a block diagram representation of the browser event notification order list 144E after installation of primary security extension 140 and secondary security extension 142 in accordance with one embodiment of the invention. In the present embodiment, event 302 is now initially received by primary security extension 140, shown as PSBHO 304A, which is now first, i.e., "1", in the event notification order, then to BHO A, which is now second in the event notification order, and then subsequently through to secondary security extension 142, shown as SSBHO 306A, which is now last, i.e., "9", in the event notification order.

As PSBHO 304A obfuscates the user confidential data in event 302 (operation 216 (FIG. 2A)), malicious BHO D receives the event, but can access only obfuscated data. Thus, the user confidential data has been secured from compromise by malicious BHO D. SSBHO 306A de-obfuscates the obfuscated data in the event (operation 222 (FIG. 2B)), thus restoring the user confidential data in the event prior to further processing.

Referring now to FIG. 3C, FIG. 3C illustrates a block diagram representation of the browser event notification order list 144C after installation of primary security extension 140 and secondary security extension 142 in which exempted browser extensions are present in accordance with embodiment of the invention. In the present embodiment, assume browser extensions BHO B and BHO G are exempted browser extensions, herein collectively illustrated as exempted browser extensions 308.

When secondary security extension 142, i.e., SSBHO 306B is installed, BHO B and BHO G, i.e., exempted browser extensions 308, are placed after secondary security BHO 142 in the event notification order list 144C. Thus, SSBHO 306B is still "last" in the event notification order relative to un-exempted browser extensions, e.g., BHO A, BHO C, BHO D, BHO E, and BHO F. However, exempted browser extensions 308 are present subsequent to SSBHO 306B in browser event notification order list 144C. Thus, FIG. 3C illustrates that "last" can be further defined as last in the event notification order relative to non-exempt browser extensions where exempted browser extensions, e.g., exempted browser extensions 308, are present.

Accordingly, in FIG. 3C, event 302 is initially received by primary security extension 140, shown as PSBHO 304A, which is first in the event notification order, then passed to BHO A, which is now second, and then subsequently through to secondary security extension 142, shown as SSBHO 306B, which is now last relative to the non-exempt browser extensions 308. Thus, as shown in FIG. 3C, the user confidential data is secured against compromise by malicious BHO D, as the user confidential data is obfuscated by PSBHO 304A, but the user confidential data is made available to exempted browser extensions 308 by placing exempted browser extensions 308 subsequent to SSBHO 306B in browser event notification order list 144C.

Figure 4A:
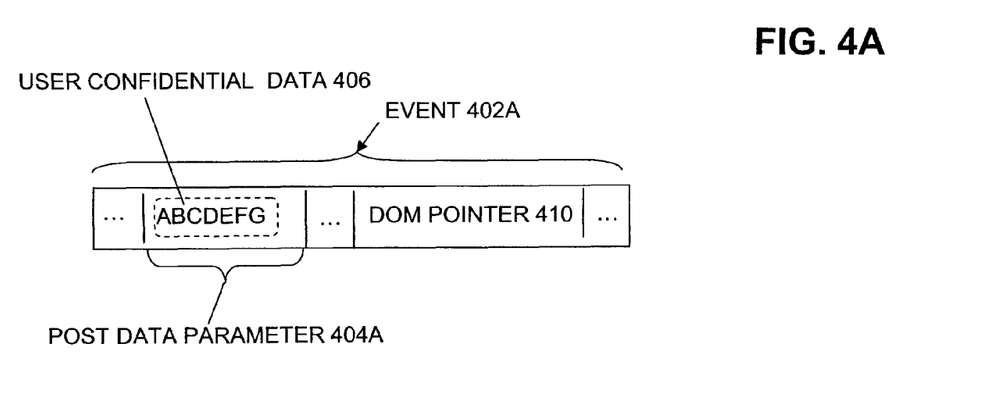
FIG. 4A illustrates a block diagram representation of an event including user confidential data and a data object model (DOM) pointer prior to obfuscation of the user confidential data and/or replacement of the data object model (DOM) pointer.

Referring now to FIGS. 4A, 4B, and 4C, FIG. 4A illustrates a block diagram representation of an event 402A including user confidential data 406 and a data object model (DOM) pointer 410 prior to obfuscation of the user confidential data and/or replacement of the data object model (DOM) pointer. As illustrated, user confidential data 406 is present in a post data parameter 404A of event 402A, as well as a DOM pointer 410. Thus, should event 402A be received by a malicious browser extension, user confidential data 406 and DOM pointer 410 would be accessible by the malicious browser extension and subject to compromise.

Figure 4B:
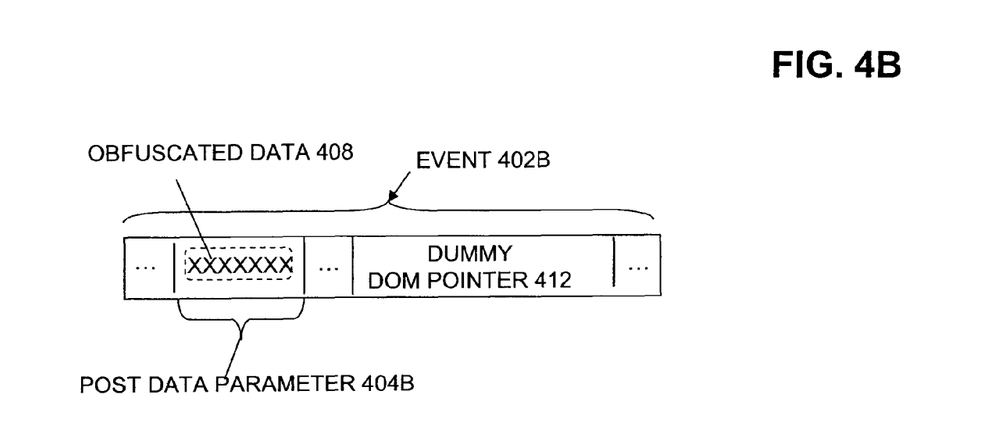
FIG. 4B illustrates a block diagram representation of an event in which the user confidential data and the DOM pointer are obfuscated/replaced in accordance with one embodiment of the invention.

FIG. 4B illustrates a block diagram representation of an event 402B in which the user confidential data and the DOM pointer of FIG. 4A are obfuscated/replaced in accordance with one embodiment of the invention. As illustrated, following obfuscation of user confidential data 406 (FIG. 4A) by primary security extension 140 in operation 216 (FIG. 2A), post data parameter 404B now includes obfuscated data 408. Further, in some embodiments, in operation 216, DOM pointer 410 (FIG. 4A) is replaced with dummy DOM pointer 412. Thus, following obfuscation in operation 216 (FIG. 2A), the user confidential data originally present in event 402A (FIG. 4A) is secured against compromise by browser extensions subsequent to primary security extension 140, unless exempted as earlier described.

Figure 4C:
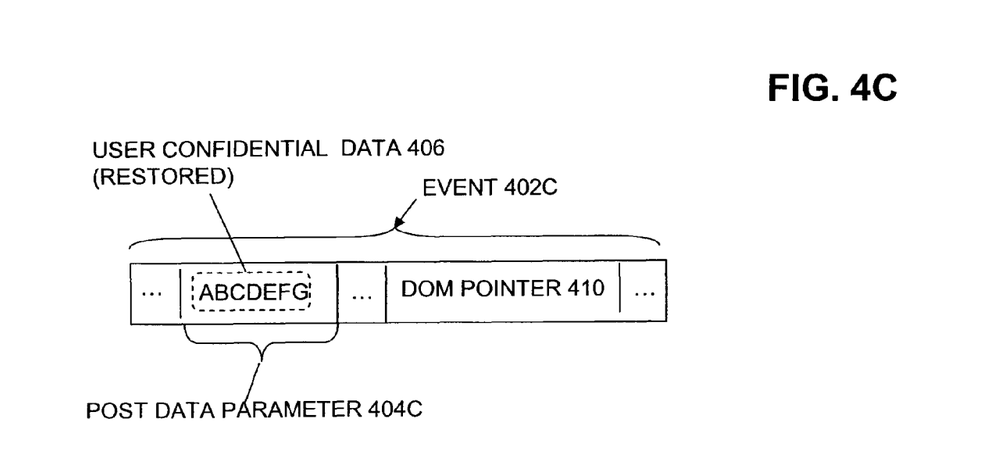
FIG. 4C illustrates a block diagram representation of an event in which the user confidential data is de-obfuscated and the DOM pointer is restored in accordance with one embodiment of the invention.

FIG. 4C illustrates a block diagram representation of an event 402C in which user confidential data 406 and DOM pointer 410 of FIG. 4A are restored in accordance with one embodiment of the invention. As illustrated, following de-obfuscation by secondary security extension 142 in operation 222 (FIG. 2B), post data parameter 404C now includes restored user confidential data 406 and dummy DOM pointer 412 (FIG. 4B) is replaced with restored DOM pointer 410. Thus, following de-obfuscation in operation 222 (FIG. 2B), the user confidential data and the DOM object originally present in event 402A (FIG. 4A) is restored to the event for further processing, such as by subsequent exempted browser extensions in the event notification order list, and/or the web browser, such as for sending to a web server.

Referring again to FIG. 1, security application 106 is in memory 112. As used herein, a computer memory refers to a volatile memory, a non-volatile memory, or a combination of the two. Although security application 106 is referred to as an application, this is illustrative only. Security application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a host computer system configuration, an embodiment of the present invention may be carried out using any suitable means and/or hardware configuration involving a personal computer, a workstation, a portable device, or a network of computer devices. Other network configurations other than host computer system configurations, e.g., client-server, peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. In another embodiment, a computer program product comprises a tangible storage medium configured to store computer readable code including CD-ROM discs, DVDs, ROM cards, floppy discs, magnetic tapes, computer hard drives and servers on a network.

As illustrated in FIG. 1, this medium may belong to the computer system itself. However, the medium also may be removed from the computer system. For example, security application 106 may be stored in memory 134 that is physically located in a location different from processor 108. Processor 108 should be coupled to the memory 134. This could be accomplished in a client-server system, or alternatively via a connection to another computer via modems and analog lines, or digital interfaces and a digital carrier line.

More specifically, in one embodiment, host computer system 102 and/or server computer system 130 are a portable computer, a workstation, a two-way pager, a cellular telephone, a digital wireless telephone, a personal digital assistant, a server computer, an Internet appliance, or any other device that includes components that can execute the functionality in accordance with at least one of the embodiments as described herein. Similarly, in another embodiment, host computer system 102 and/or server computer system 130 are comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionalities of security application 106 in accordance with the embodiments of the present invention can be implemented in a wide variety of computer system configurations. In addition, the functionalities of security application 106 could be stored as different modules in memories of different devices. For example, security application 106 could initially be stored in computer system 130, and then as necessary, a portion of security application 106 could be transferred to host computer system 102 and executed on host computer system 102. Consequently, part of the functionality of security application 106 would be executed on processor 132 of server computer system 130, and another part would be executed on processor 108 of host computer system 102.

In view of this disclosure, those of skill in the art can implement various embodiments of the present invention in a wide-variety of physical hardware configurations using an operating system and computer programming language of interest to the user. In yet another embodiment, security application 106 is stored in memory 134 of server computer system 130. Security application 106 is transferred over network 128 to memory 112 in host computer system 102. In this embodiment, I/O interface 110 and I/O interface 136 would include analog modems, digital modems, or a network interface card. If modems are used, network 128 includes a communications network, and security application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A system for securing user confidential data from untrusted browser extensions comprising:
   a memory having stored therein a security application for securing user confidential data from untrusted browser extensions; and
   a processor coupled to said memory, wherein execution of said security application performs a method comprising:
   receiving a user data event at a primary security browser extension, said primary security browser extension being first in a browser event notification order list, said user data event including user confidential data;
   obfuscating said user confidential data in said user data event, said obfuscating replacing said user confidential data with obfuscated data in said user data event;
   releasing said user data event including said obfuscated data for processing by a subsequent browser extension next in said browser event notification order list;
   receiving said user data event including said obfuscated data at said secondary security browser extension;
   de-obfuscating said obfuscated data in said user data event, said de-obfuscating replacing said obfuscated data with said user confidential data in said user data event;
   releasing said user data event including said user confidential data for further processing;
   installing said primary security browser extension, wherein said primary security browser extension is registered as first to receive a browser event in said browser event notification order list;
   installing said secondary security browser extension, wherein said secondary security browser extension is registered as last to receive a browser event in said browser event notification order list;
   disabling one or more enumerated browser extension and extension threads from receiving one or more selected browser events prior to said release of said user data event from said primary security browser extension to a subsequent browser extension next in said event notification order list; and
   re-enabling said disabled one or more enumerated browser extensions and extension threads to receive said selected browser events prior to said release of said user data event from said secondary security browser extension for further processing.

2. The system of claim 1 further comprising:
   determining whether here are exempted browser extensions present in said browser event notification order list; and wherein when there are exempted browser extensions present in said browser event notification order list, placing said exempted browser extensions subsequent to said secondary security browser extension in said browser event notification order list.

3. The system of claim 1 further comprising:
   receiving a browser event at said primary security browser extension;
   determining whether said browser event is a user data event;
   wherein when said browser event is not determined to be a user data event, releasing said browser event for further processing by a subsequent browser extension next in said browser event notification order list; and
   wherein when said browser event is determined to be a user data event, allowing said computer implemented method to continue.

4. The system of claim 1 wherein said obfuscating said user confidential data comprises:
   encrypting said user confidential data located in a post data parameter of said user data event utilizing a security key to generate encrypted data, and
   replacing said user confidential data in said post data parameter of said user data event with said encrypted data; and
   further wherein said de-obfuscating said obfuscated data comprises:
   decrypting said encrypted data in said post data parameter of said user data event utilizing said security key to generate said user confidential data, and
   replacing said encrypted data with said user confidential data in said post data parameter of said user data event.

5. The system of claim 1 wherein said obfuscating said user confidential data comprises:
   replacing said user confidential data in a post data parameter of said user data event with dummy data, said dummy data being different from said user confidential data, and
   storing said user confidential data to a secure memory storage structure; and
   further wherein said de-obfuscating said obfuscated data comprises:
   retrieving said user confidential data from said secure memory storage structure, and
   replacing said dummy data in said post data parameter of said user data event with said user confidential data.

6. The system of claim 5 wherein said user confidential data is stored in a memory storage structure of a security service.

7. The system of claim 1 wherein said obfuscating said user confidential data comprises:
   replacing a data object model (DOM) pointer in said user confidential event with a dummy DOM pointer, said dummy DOM pointer being different from said DOM pointer, and
   storing said DOM pointer to a secure memory storage structure; and
   further wherein said de-obfuscating said obfuscated data comprises:
   retrieving said DOM pointer from said secure memory storage structure, and replacing said dummy DOM pointer in said user data event with said DOM pointer.

8. The system of claim 7 wherein said one or more selected browser events comprise: a data object model (DOM) state event.

9. A computer system comprising:
a memory having stored therein a security application for securing user confidential data from untrusted browser extensions; and
a processor coupled to said memory, wherein execution of said security application generates a method comprising:
installing a primary security browser extension in a browser event notification order list, said primary security browser extension being registered first to receive a browser event in said browser event notification order list;
installing a secondary security browser extension in a browser event notification order list, said secondary security browser extension is registered to last to receive a browser event in said browser event notification order list;
receiving a user data event at a primary security browser extension, said primary security browser extension being first in a browser event notification order list, said user data event including user confidential data;
obfuscating said user confidential data in said user data event, said obfuscating replacing said user confidential data with obfuscated data in said user data event;
releasing said user data event including said obfuscated data for processing by a subsequent browser extension next in said browser event notification order list;
receiving said user data event including said obfuscated data at said secondary security browser extension;
de-obfuscating said obfuscated data in said user data event, said de-obfuscating replacing said obfuscated data with said user confidential data in said user data event;
releasing said user data event including said user confidential data for further processing;
disabling one or more enumerated browser extension and extension threads from receiving one or more selected browser events prior to said release of said user data event from said primary security browser extension to a subsequent browser extension next in said event notification order list; and
re-enabling said disabled one or more enumerated browser extensions and extension threads to receive said selected browser events prior to said release of said user data event from said secondary security browser extension for further processing.

10. The computer system of claim 9 further comprising:
determining whether there are exempted browser extensions present in said browser event notification order list; and
wherein when there are exempted browser extensions present in said browser event notification order list, placing said exempted browser extensions subsequent to said secondary security browser extension in said browser event notification order list.

11. The computer system of claim 9 wherein said user confidential data includes at least one of user confidential data in a post data parameter of said user data event and a data object model (DOM) pointer in said user data event.

12. The computer system of claim 9 wherein said obfuscating said user confidential data comprises:

encrypting said user confidential data located in a post data parameter of said user data event utilizing a security key to generate encrypted data, and
replacing said user confidential data in said post data parameter of said user data event with said encrypted data; and
further wherein said de-obfuscating said obfuscated data comprises:
decrypting said encrypted data in said post data parameter of said user data event utilizing said security key to generate said user confidential data, and
replacing said encrypted data with said user confidential data in said post data parameter of said user data event.

13. The computer system of claim 9 wherein said obfuscating said user confidential data comprises:
replacing said user confidential data in a post data parameter of said user data event with dummy data, said dummy data being different from said user confidential data, and
storing said user confidential data to a secure memory storage structure; and
further wherein said de-obfuscating said obfuscated data comprises:
retrieving said user confidential data from said secure memory storage structure, and
replacing said dummy data in said post data parameter of said user data event with said user confidential data.

14. The computer system of claim 9 wherein said obfuscating said user confidential data comprises:
replacing a data object model (DOM) pointer in said user confidential event with a dummy DOM pointer, said dummy DOM pointer being different from said DOM pointer, and
storing said DOM pointer to a secure memory storage structure; and
further wherein said de-obfuscating said obfuscated data comprises:
retrieving said DOM pointer from said secure memory storage structure, and
replacing said dummy DOM pointer in said user data event with said DOM pointer.

15. The computer system of claim 14 wherein said one or more selected browser events comprise: a data object model (DOM) state event.

16. A computer-program product comprising a nontransitory computer readable storage medium containing computer program code comprising:
a security application for securing user confidential data from untrusted browser extensions;
said security application further for installing a primary security browser extension first a browser event notification order list;
said security application further for installing a secondary security browser extension last in said browser event notification order list;
said primary security browser extension further for receiving a user data event from a web browser, said user data event including user confidential data;
said primary security browser extension further for obfuscating said user confidential data in said user data event, said obfuscating replacing said user confidential data with obfuscated data in said user data event;
said primary security browser extension further for releasing said user data event including said obfuscated data for processing by a subsequent browser extension next in said browser event notification order list;

said secondary security browser extension further for receiving said user data event including said obfuscated data;

said secondary security browser extension further for de-obfuscating said obfuscated data in said user data event, said de-obfuscating replacing said obfuscated data with said user confidential data in said user data event;

said secondary security browser extension further for releasing said user data event including said user confidential data for further processing;

said primary security browser extension further for disabling one or more enumerated browser extension and extension threads from receiving one or more selected browser events prior to said release of said user data event from said primary security browser extension to a subsequent browser extension next in said event notification order list; and said secondary security browser extension further for re-enabling said disabled one or more enumerated browser extensions and extension threads to receive said selected browser events prior to said release of said user data event from said secondary security browser extension for further processing.

* * * * *

UNITED STATES PATENT AND TRADEMARK OFFICE
CERTIFICATE OF CORRECTION

| | | |
|---|---|---|
| PATENT NO. | : 7,975,308 B1 | Page 1 of 1 |
| APPLICATION NO. | : 11/864346 | |
| DATED | : July 5, 2011 | |
| INVENTOR(S) | : Sourabh Satish, Govind Salinas and Zulfikar Ramzan | |

It is certified that error appears in the above-identified patent and that said Letters Patent is hereby corrected as shown below:

In Column 14, Line 5, Claim 2, replace "here" with --there--.

Signed and Sealed this
Eleventh Day of September, 2012

David J. Kappos
*Director of the United States Patent and Trademark Office*